US006727632B2

(12) United States Patent
Kusase

(10) Patent No.: US 6,727,632 B2
(45) Date of Patent: Apr. 27, 2004

(54) FLAT ROTARY ELECTRIC MACHINE

(75) Inventor: Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/295,891

(22) Filed: Nov. 18, 2002

(65) Prior Publication Data

US 2003/0102764 A1 Jun. 5, 2003

(30) Foreign Application Priority Data

| Nov. 27, 2001 | (JP) | 2001-360904 |
| Nov. 27, 2001 | (JP) | 2001-360905 |
| Nov. 27, 2001 | (JP) | 2001-360906 |
| Aug. 23, 2002 | (JP) | 2002-243592 |

(51) Int. Cl.[7] .............................................. H02K 1/22
(52) U.S. Cl. .................. 310/266; 310/181; 310/191; 310/209; 310/216; 310/259; 310/156.26; 310/156.37; 310/112
(58) Field of Search ........................... 310/266, 216–218, 310/179–181, 191, 209, 112, 114, 254, 258, 259, 156.32–156.37, 156.26, 156.48, 267–269

(56) References Cited

U.S. PATENT DOCUMENTS

| 3,411,027 A | * | 11/1968 | Rosenberg ................. 310/181 |
| 4,349,761 A | * | 9/1982 | Aoki ......................... 310/266 |
| 4,731,554 A | * | 3/1988 | Hall et al. ................. 310/67 R |
| 4,900,965 A | * | 2/1990 | Fisher ........................ 310/216 |
| 4,924,128 A | * | 5/1990 | Vaillant de Guelis et al. ... 310/156.26 |
| 5,262,693 A | * | 11/1993 | Holka ........................ 310/121 |
| 5,311,092 A | * | 5/1994 | Fisher ........................ 310/266 |
| 5,579,188 A | * | 11/1996 | Dunfield et al. ......... 360/99.08 |
| 5,767,601 A | * | 6/1998 | Uchiyama ................... 310/190 |
| 5,793,136 A | * | 8/1998 | Redzic ....................... 310/114 |
| 6,002,192 A | * | 12/1999 | Krivospitski et al. ....... 310/266 |
| 6,531,799 B1 | * | 3/2003 | Miller ......................... 310/114 |
| 6,570,275 B2 | * | 5/2003 | Kim et al. ..................... 310/12 |

* cited by examiner

Primary Examiner—Dang Le
(74) Attorney, Agent, or Firm—Oliff & Berridge, PLC

(57) ABSTRACT

A flat rotary electric machine to be mounted in a vehicle engine includes an annular stator core with a plurality of teeth and an armature winding and a field unit including a gutter-like field core having a pair of coaxial cylindrical core members. A plurality of permanent magnets are disposed on the cylindrical core members and an annular field coil disposed between the cylindrical core members. Each of the cylindrical core members has a plurality of magnet-conductive salient magnetic poles disposed between the permanent magnets, the permanent magnets are magnetized so that all the magnetic flux thereof can cross the stator through the teeth in the same direction.

15 Claims, 11 Drawing Sheets

ROTATION DIRECTION

FLAT ROTARY ELECTRIC MACHINE

CROSS REFERENCE TO RELATED APPLICATION

The present application is based on and claims priority from the following Japanese Patent Applications: 2001-360904, filed Nov. 27, 2001; 2001-360905, filed Nov. 27, 2001; 2001-360906, filed Nov. 27, 2001; and 2002-243592, filed Aug. 23, 2002; the contents of which are incorporated herein by reference.

BACKGROUND OF THE INVENTION

1. Field of the Invention

The present invention relates to a synchronous rotary electric machine and, particularly, a flat rotary electric machine to be directly connected to an engine of a vehicle.

2. Description of the Related Art

A synchronous rotary electric machine disposed between a transmission and an engine of a vehicle has to be as flat as possible because of a limited space of the engine compartment of the vehicle. Generally, such a synchronous rotary electric machine has a stator that has a distributed or concentrated winding on the radially inner or outer surface thereof. Such a winding has long coil ends that do not contribute to power generation but to large copper loss. In addition, such a stator winding requires a considerably large space.

SUMMARY OF THE INVENTION

Therefore, the present invention has been made in view of the above problem.

A main object of the invention is to provide a compact and efficient flat rotary electric machine.

According to a main feature of the invention, a flat rotary electric machine includes a stator having an annular stator core with a plurality of teeth projecting in opposite directions and an armature winding wound around the stator core, and a field unit including a gutter-like field core having a pair of coaxial cylindrical core members, a plurality of permanent magnets disposed on the cylindrical core members to face the teeth through a first air gap so that one of the permanent magnets on one of the cylindrical core members is disposed between adjacent two of the permanent magnets on the other cylindrical core member and an annular field coil disposed between the cylindrical core members. Each of the cylindrical core member has a plurality of magnet-conductive poles disposed between the permanent magnets to face the stator through a second air gap. The permanent magnets are magnetized so that all the magnetic flux thereof can cross the stator in the same direction. Preferably, the sectional area of the first air gap is larger than the sectional area of the second air gap, and the armature winding may be comprised of a plurality of toroidal coils.

According to another feature of the invention, the stator of the rotary electric machine described above comprises a plurality of tooth-and-yoke units having a tooth which is inserted into one of the toroidal coils and an arc-shaped teeth-and-yoke unit connected to one another by a coupling. The coupling may be comprised of a concavity disposed at one circumferential end of the teeth-and-yoke unit and a convexity disposed at the other circumferential end.

According to another feature of the invention, a flat rotary electric machine includes a stator having an annular stator core with a plurality of teeth projecting in opposite directions and an armature winding, a rotary field core including an open gutter portion having a pair of cylindrical core members respectively disposed to face the teeth and a closed gutter portion having a space, a plurality of permanent magnets disposed on the cylindrical core members to face the teeth through a first air gap so that one of the permanent magnets on one of the pair of cylindrical core members is disposed between adjacent two of the permanent magnets on the other cylindrical core member and a stationary annular field coil disposed in the space of the closed gutter portion to supply magnetic flux thereto.

According to another feature of the invention, a flat rotary electric machine includes a magnet-conductive housing, an annular stator core fixed to and magnetically connected to the housing, a rotary field core having a plurality of magnetic poles circumferentially disposed at intervals of 360 degree in electric angle to face the teeth through a first air gap, a plurality of permanent magnets on the field core to face the teeth through a second air gap so that one of the permanent magnets is disposed between adjacent two of the magnetic poles, a stationary field coil unit fixed and magnetically connected to the housing to be disposed between the stator core and the rotary field core. The field coil unit has an annular field coil for polarizing the magnetic poles and a yoke member facing the rotary field core through a third air gap, and the permanent magnets are magnetized so that all the magnetic flux thereof can cross the stator through the teeth in the same direction.

According to another feature of the invention, a flat rotary electric machine includes a stator having a laminated annular stator core with a plurality of teeth projecting in opposite directions and an armature winding wound between the teeth and a rotary field unit including a gutter-like field core having a pair of parallel core members disposed to face the teeth, a plurality of permanent magnets circumferentially disposed on one of the core members to face the teeth through a first air gap and a plurality of magnet-conductive poles circumferentially disposed on the other of the cylindrical members thereby forming magnetic passage of magnetic flux of the permanent magnets and an annular field coil disposed near the yoke member between the core members so as to polarize the magnet-conductive poles. The field coil polarizes the magnetic poles so as to change the magnetic passages of magnetic flux of the permanent magnets.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Various preferred embodiments of the invention and variations thereof are described with reference to the appended drawings.

Figure 1:
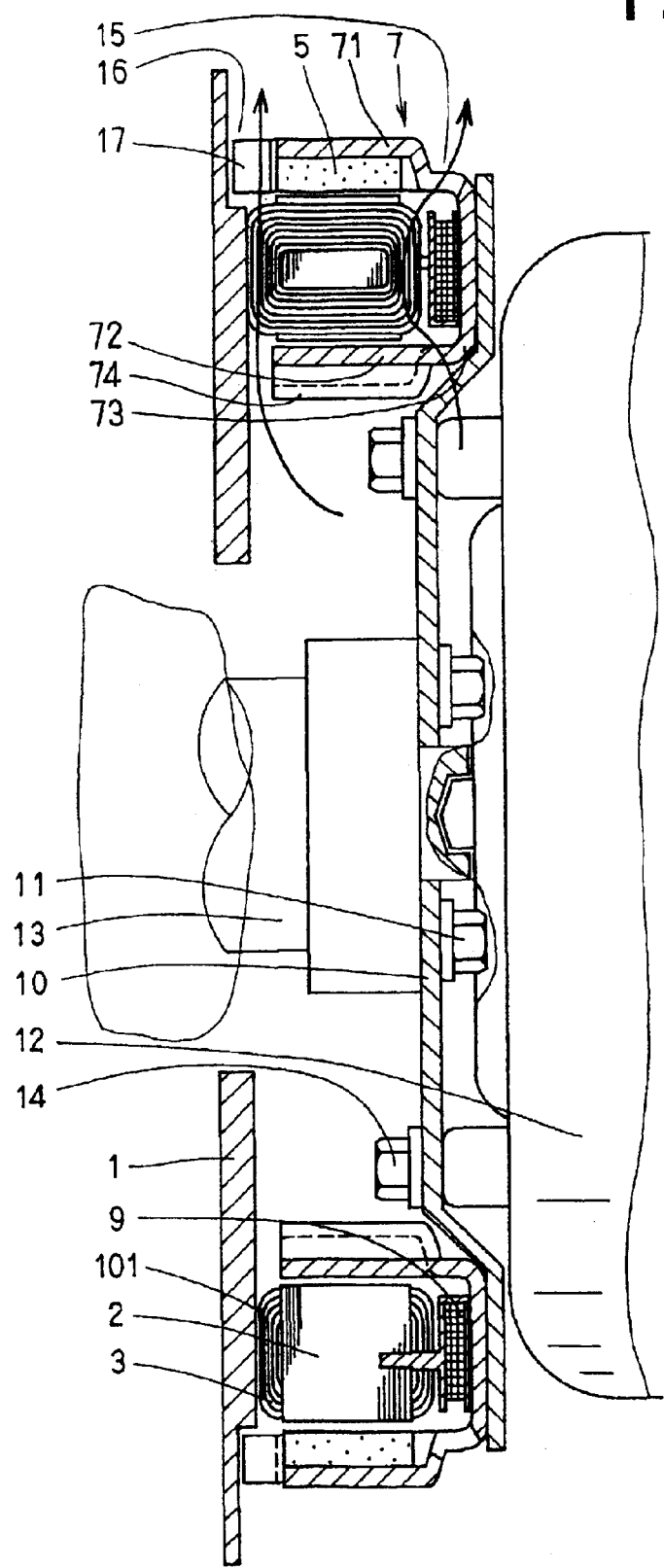
FIG. 1 is a schematic cross-sectional side view of a rotary electric machine according to the first embodiment of the invention.

A generator directly connected to a vehicle engine is described with reference to FIGS. 1 and 2, as the first embodiment of the invention.

The generator according to the first embodiment is comprised of a housing 1, a stator including an annular armature core 2, an armature winding 3 wound around the armature core 2 and a rotor including a plurality of permanent magnets 5 and a gutter-like rotor core 7 that is made from an iron plate to support the permanent magnets 5.

The armature core 2 is fixed to the housing 1 via a heat sink member 101 so that the armature winding 3 can thermally contact the heat sink member 101. As shown in FIG. 2, the armature core 2 is comprised of a plurality of teeth-and-yoke units or teeth-and-yoke unit 20 that is formed from a plurality of laminated iron sheets and has an outer radial tooth 21 extending outwardly, inner radial tooth 22 extending inwardly and an arc-shaped yoke portion 23 circumferentially extending from the middle of the teeth-and-yoke unit 20 between the outer and inner teeth 21, 22. Each of the teeth-and-yoke unit 20 has one of a pair of concavity-convexity connection portions to be connected to another at opposite ends of the yoke portion 23, so that the armature core 2, as a while, provides a plurality of radial teeth 21, 22 and a circular yoke comprised of all the teeth-and-yoke units 20. Three teeth 21, 22 are disposed in each two-pole pitch (an angular interval between two permanent magnets) so that a $2\pi/3$ short-pitch winding can be provided in this embodiment. However, six teeth 21, 22 can be disposed in each two-pole pitch to provide a pair of three-phase short pitch windings to reduce magnetic noise due to armature reaction effectively.

The armature winding 3 is comprised of a plurality of toroidal coils 30 connected to form a three-phase winding. Each of the toroidal coils 30 is fitted to the yoke portion 23 of each of the teeth-and-yoke units 20 before the teeth-and-yoke units 20 are connected to one another at the concavity-convexity connection portions.

The gutter-like rotor core 7 has three side members forming a U-shape in its cross section surrounding the armature core 2, which are a pair of coaxial cylindrical core members 71, 72 and a bottom yoke member 73. Each of the cylindrical core members 71, 72 has a plurality of salient magnetic poles 74 disposed at equal intervals in the circumferential direction of the core members 71, 72 to project toward the armature core 2. The salient magnetic poles 74 are formed by bending or cutting from portions of the core members 71, 72. As shown in FIG. 2, each of the permanent magnet is fixed to the portions of the cylindrical core members 71, 72, by adhesive agent or some other fixing member, between two of the salient magnetic poles 74.

In order to protect the permanent magnets 5 from centrifugal force, the permanent magnets may be bound by a nylon wire, a carbon fiber or a stainless steel band. One of the salient magnetic poles 74 of the outer cylindrical member 71 is located at the same angular position of one of the permanent magnets 5 of the inner cylindrical member 72. All the permanent magnets 5 are magnetized in the same radial direction so that the magnetic flux flows from the permanent magnets of the outer cylindrical member 71 to the permanent magnets of the inner cylindrical member 72.

A cylindrically wound field coil 9 is disposed near the yoke member 73 between the pair of cylindrical core members 71, 72. The field coil 9 is housed in an annular insulation bobbin, which is fixed to the armature core by a plurality of rivets.

Air gaps 211, 221 formed between the permanent magnets 5 and the teeth 21, 22 of the armature core 2 have 20% larger sectional area than air gaps 212, 222 formed between the salient magnetic poles 74 and the teeth 21, 22.

The gutter-like rotor core 7 is welded to an iron hub plate 10, which is fixed to a torque converter 12 and a crankshaft 13 of the engine by bolts 11, 12. The outer cylindrical member 71 of the rotor core 7 has a plurality of air vents 15. A plurality of vents 16 and fan blades 17 are also formed between the outer cylindrical member and the housing 1.

When the crankshaft 13 of the engine rotates the hub 10, the rotary core 7 rotates to provide a rotating magnetic field. Consequently, ac voltage is generated by the armature winding 3, which is converted by a three-phase rectifier unit to DC power. While the field coil 9 and the armature winding 3 are heating up, cooling air is introduced from the air vents 15 and 16 by the fan blades 17 as indicated by arrows in FIG. 1. The armature winding 3 is also cooled by the heat sink 101 via coil ends that contact the heat sink 101.

Figure 2:
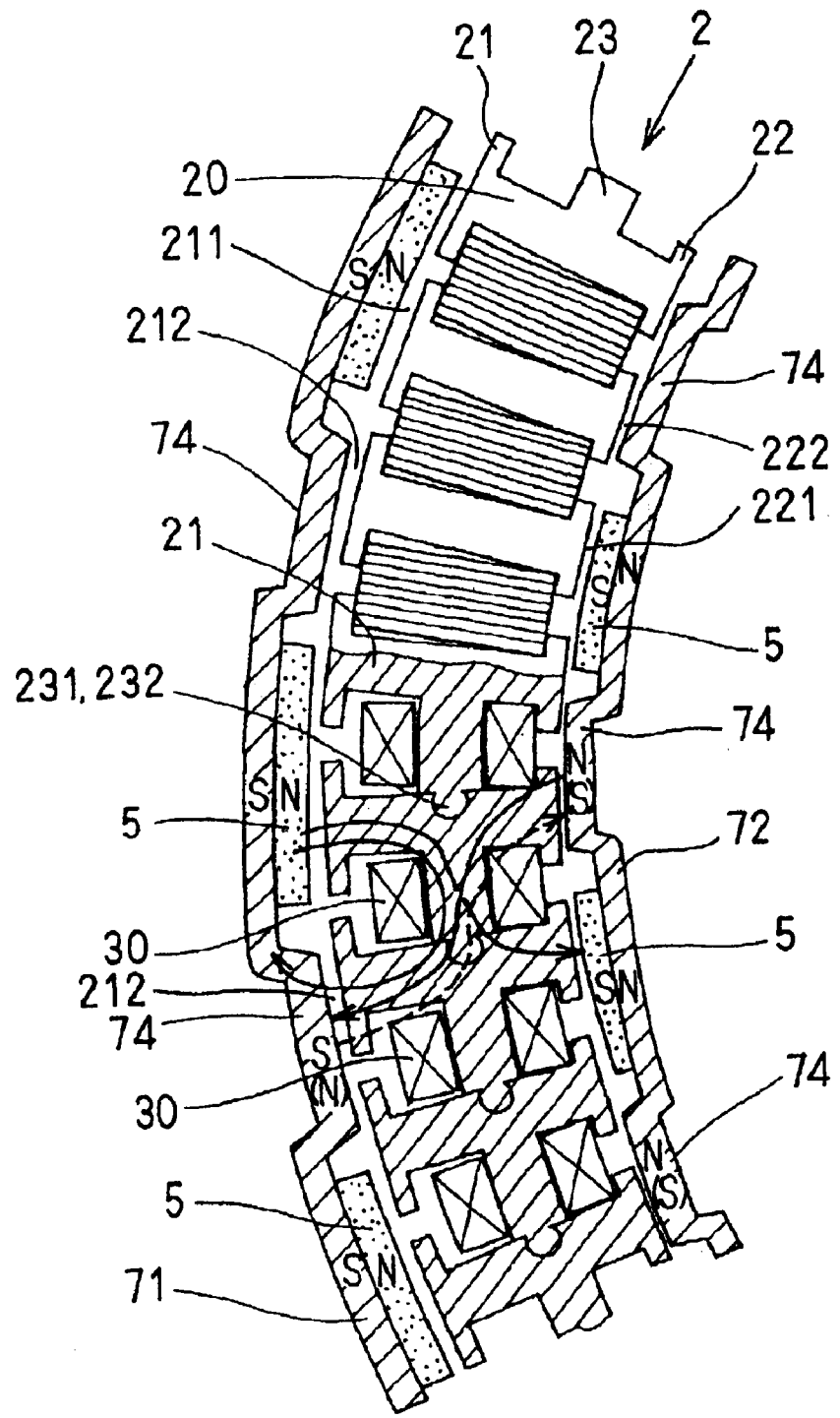
FIG. 2 is a partially cross-sectional enlarged plan view of a main portion of the rotary electric machine shown in FIG. 1.

Because the permanent magnets 5 and the salient magnetic poles 74 are disposed on the outer and inner cylindrical core members 71 and 72 alternately in the circumferential direction of the rotor core 3, there are two passages of the magnetic flux for each permanent magnet 5, a first passage for the magnetic flux flowing from one permanent magnet disposed on one of the cylindrical core member 71 through the arc-shaped yoke portion 23 and one of the salient magnetic poles 74 to the same permanent magnet 5, and a second passage for the magnetic flux flowing from the same permanent magnet 5 through the arc-shaped yoke portion 23 to another permanent magnet 5 disposed on the other cylindrical core member 72, as shown in FIG. 2.

Both the magnetic flux flowing through the first passage and the magnetic flux flowing through the second passage contribute to power generation.

When field current is supplied to the field coil 9 in a direction to increase the magnetic flux flowing from the salient magnetic poles 74 of the inner cylindrical member 72 through the second air gaps 222, 212 to the salient magnetic poles 74 of the outer cylindrical member 71, effective magnetic flux that links the armature winding 3 increases, as indicated by a solid arrow in FIG. 2, thereby increasing the output power. On the other hand, the output power decreases when the field current is supplied in the opposite direction. Thus, the output power can be controlled by changing the direction of the field current to be supplied to the field coil 9 besides controlling an amount of the field current.

Because the flat type generator according to the first embodiment employs a plurality of toroidal coils as the armature winding, ineffective coil ends are eliminated. Therefore, copper loss of the armature winding can be minimized, so that a flat and compact generator can be provided.

For example, a generator according to the first embodiment having the outside diameter of 280 mm and the length of 20 mm achieves efficiency of 93% in generating 42 v-10 kw at 600 rpm. This efficiency is much higher than a common Lundell or claw-pole-rotor type synchronous generator having the outside diameter of 280 mm and the length of 80 mm, whose efficiency is 85% in generating 42 v-6 kw at 600 rpm.

Figure 3:
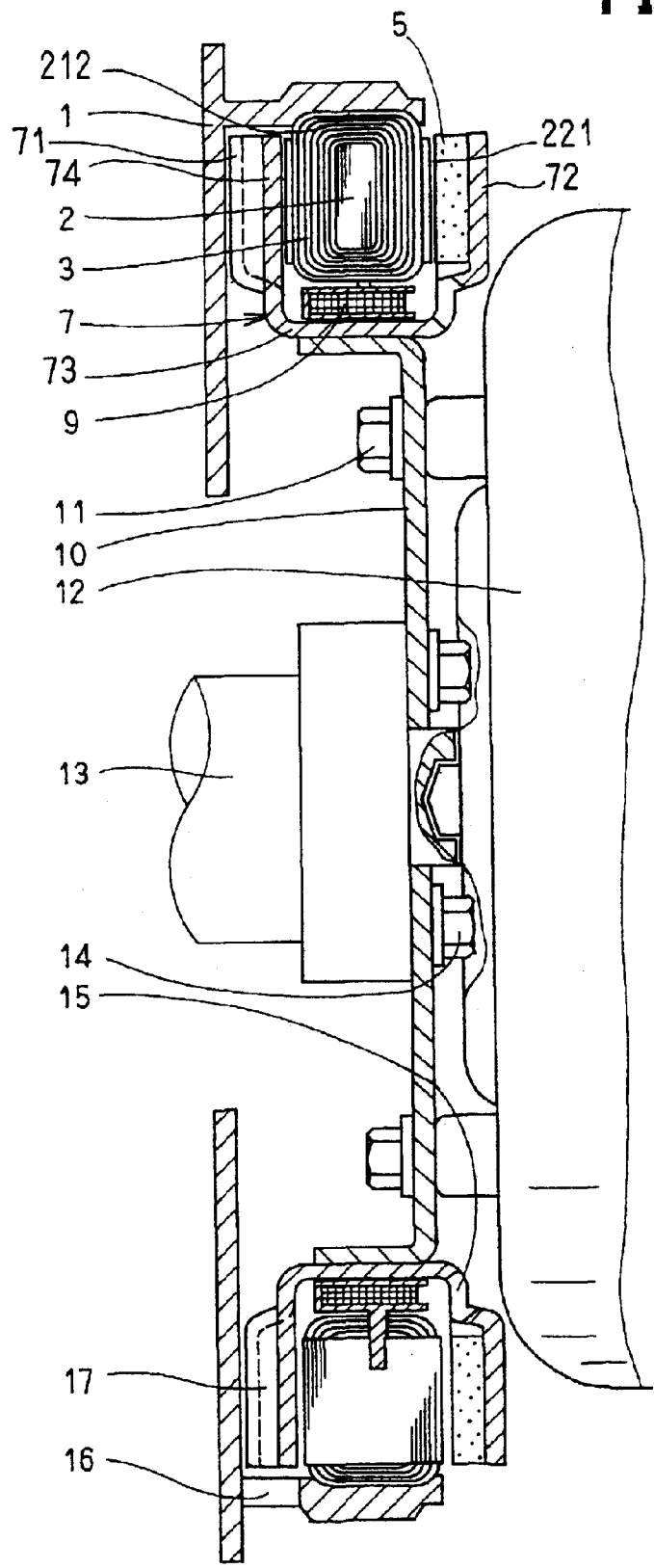
FIG. 3 is a schematic cross-sectional side view of a rotary electric machine according to the second embodiment of the invention.

A flat generator according to the second embodiment is described with reference to FIG. 3.

Incidentally, the same reference numeral represents the same or substantially the same part or portion in the following figures and discussions.

The flat generator according to the second embodiment is comprised of a housing 1, a stator including an annular armature core 2, an armature winding 3 wound around the armature core 2 and a rotor including a plurality of permanent magnets 5 and a gutter-like rotor core 7 that is made from an iron plate to support the permanent magnets 5.

The armature core 2 is fixed to the housing 1. The armature core 2 is comprised of a plurality of teeth-and-yoke units 20 connected to one another to form an annular core. Each of the teeth-and-yoke units 20 has a pair of axial teeth extending opposite directions and an arc-shaped yoke portion circumferentially extending from the middle of the teeth-and-yoke unit between the teeth. Each of the teeth-and-yoke unit 20 has a pair of concavity-convexity connection portions to be connected to another at opposite ends of the yoke portion, so that the armature core 2, as a while, provides a plurality of axial teeth and a circular yoke connecting all the teeth-and-yoke units. The armature winding 3 is comprised of a plurality of toroidal coils connected to form a three-phase winding. Each of the toroidal coils is fitted to the yoke portion of one of the teeth-and-yoke units before the teeth-and-yoke units are connected to one another at the concavity-convexity connection portions.

The gutter-like rotor core 7 has three side members forming a U-shape in its cross section surrounding the armature core 2, which are a pair of disk core members 71, 72 and a bottom yoke member 73. Each of the disk core members 71, 72 has a plurality of salient magnetic poles 74 disposed at equal intervals in the circumferential direction of the disk core members 71, 72 to project toward the teeth of 21, 22 of the armature core 2. Each of the permanent magnets 5 is fixed to the portions of the disk core members 71, 72 between two of the salient magnetic poles 74. One of the salient magnetic poles 74 of the left disk member 71 is located at the same angular position of one of the permanent magnets 5 of the right disk core member 72. All the permanent magnets 5 are magnetized in the same radial direction so that the magnetic flux flows from the permanent magnets of the left core member 71 to the permanent magnets of the right core member 72. A cylindrically wound field coil 9 is fixed to the armature core 2 in the same manner as described above. Other portions and operation are substantially the same as flat generator according to the first embodiment.

The flat generator according to the second embodiment provides a larger sectional area of the air gaps than the flat generator according to the first embodiment, which increases effective magnetic flux.

Figure 4:
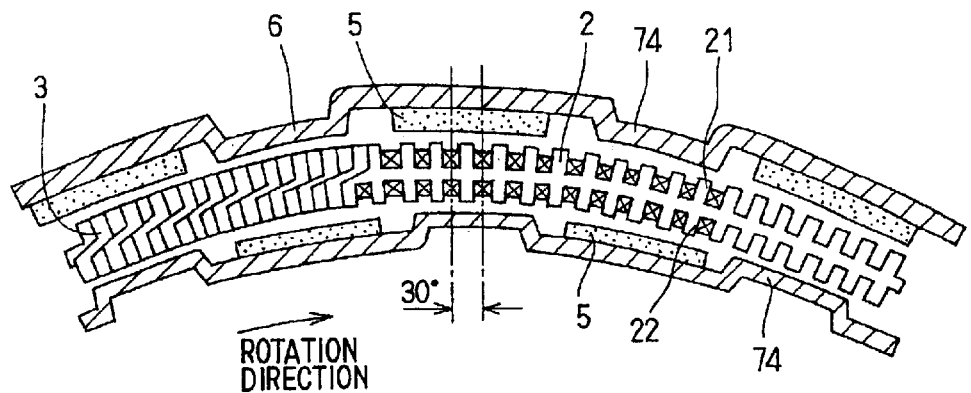
FIG. 4 is a partially cross-sectional enlarged plan view of a main portion of the rotary electric machine according to the third embodiment of the invention.

A flat generator-motor according to the third embodiment of the invention is described with reference to FIG. 4.

The generator-motor according to the third embodiment is substantially the same type as the generator according to the first embodiment. However, twelve teeth 21 or 22 are disposed in each two-pole pitch so that a pair of three-phase windings can be provided in this embodiment. The armature winding 3 is comprised of a plurality of flat conductor segments, each of which is inserted between the teeth 21, 22 and bent to form a toroidal coil, and each of the toroidal coils 30 is welded together to form the pair of three-phase windings.

Figure 5:
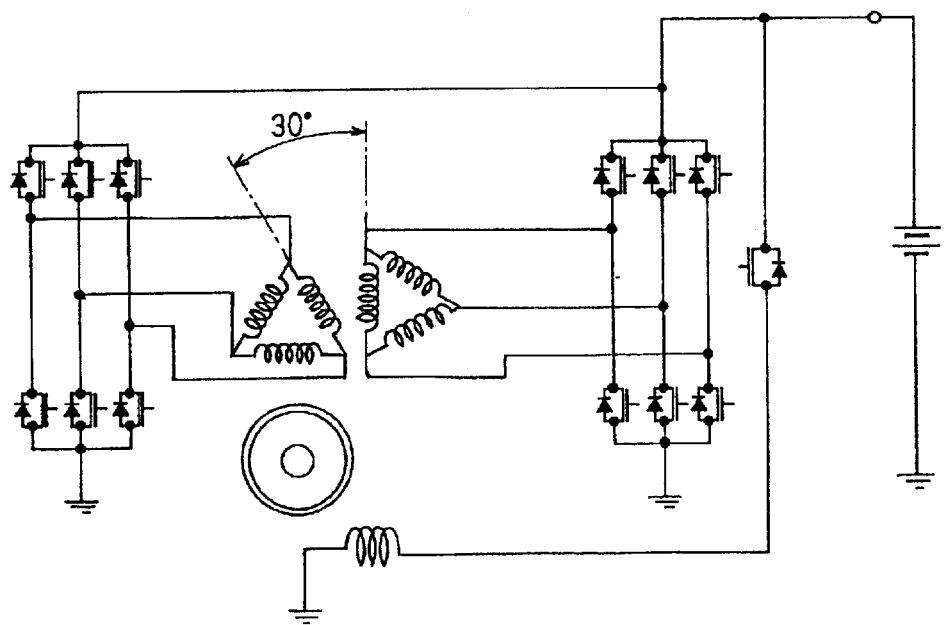
FIG. 5 is a circuit diagram of the rotary electric machine according to the third embodiment.

Because the pitch between adjacent teeth corresponds to 30 degree in electric angle, the three-phase windings are 30 degree in electric angle different from each other. The output power is converted from ac power to dc power by a pair of three-phase full-wave rectifier units, as shown in FIG. 5. Therefore, noise due to third harmonic frequency caused by armature reaction can be reduced.

Figure 6:
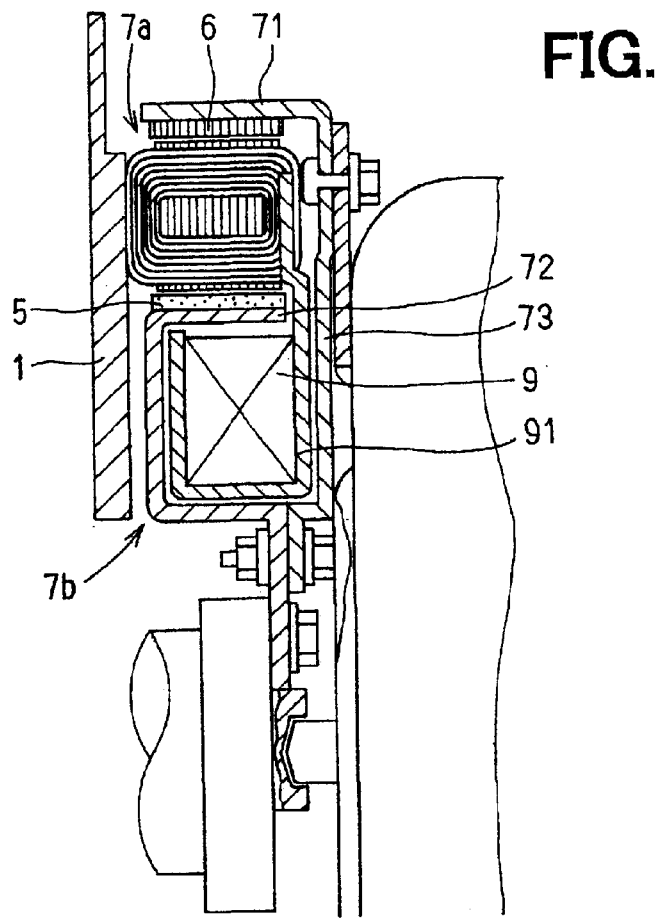
FIG. 6 is a partially cross-sectional side view of a main portion of the rotary electric machine according to the fourth embodiment of the invention.
Figure 7:
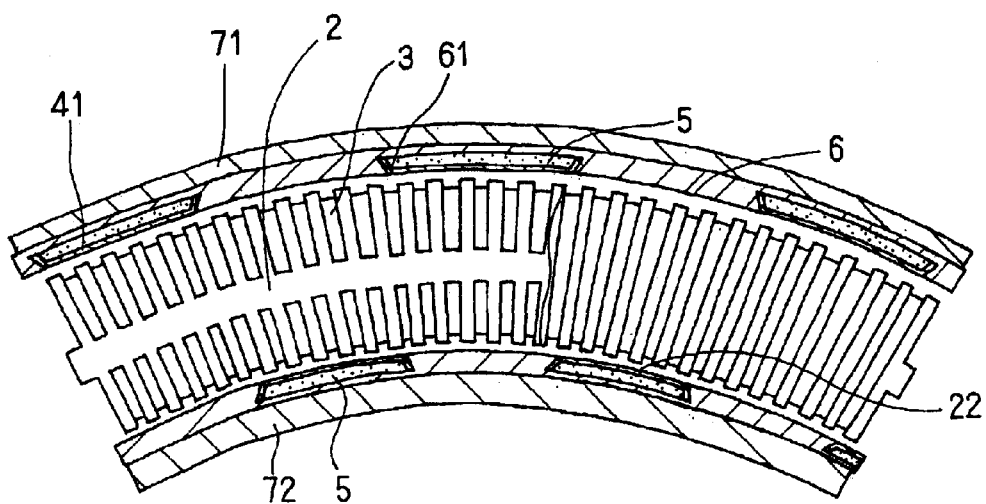
FIG. 7 is a fragmentary enlarged cross-sectional plan view of a main portion of the rotary electric machine shown in FIG. 6.

A flat generator-motor according to the fourth embodiment of the invention is described with reference to FIGS. 6 and 7.

The flat generator according to the fourth embodiment is comprised of a housing 1, a stator including an annular armature core 2, an armature winding 3, a rotor including a plurality of permanent magnets 5, a plurality of magnetic poles 6 and a rotor core 7 that is made from an iron plate to support the permanent magnets 5 and a field coil 9.

The armature core 2 has six teeth each pole-pitch. This arrangement reduces the number of turns of each coil, so that the axial length can be reduced. The armature winding 3 is comprised of a plurality of toroidal coils connected to form a three-phase winding.

The rotor core 7 has a cross-section shaped like a reversed numeral "6", which has a round head and a curled tail. In other words, the rotor core 7 has an open gutter 7a that corresponds to the curled tail which accommodates the armature core 2 with the armature winding 3 therein and a closed gutter 7b that corresponds to the round head which accommodates the field coil 9 with a gutter-like member 91 therein. The open gutter 7a has a pair of the coaxial cylindrical core members 71, 72. Each of the cylindrical core members 71, 72 has a plurality of the magnetic poles 6 made of a plurality of laminated iron sheets. The magnetic poles 6 made of laminated iron sheets are effective to reduce iron loss.

A wedge-like or dovetail groove 61 is formed between each two of the salient magnetic poles 74 so that one of the permanent magnets 5 is inserted and fixed to the groove 61 with a stainless cover plate 41. The cover plate 41 protects the permanent magnet 4 from centrifugal force and other mechanical forces.

One of the magnetic poles 6 of the outer cylindrical member 71 is located at the same angular position of one of the permanent magnets 5 of the inner cylindrical member 72. The cylindrically wound field coil 9 is supported by the gutter-like yoke member 91 at one end. The yoke member 91 is fixed to the armature core 2 at the other end.

Figure 8:
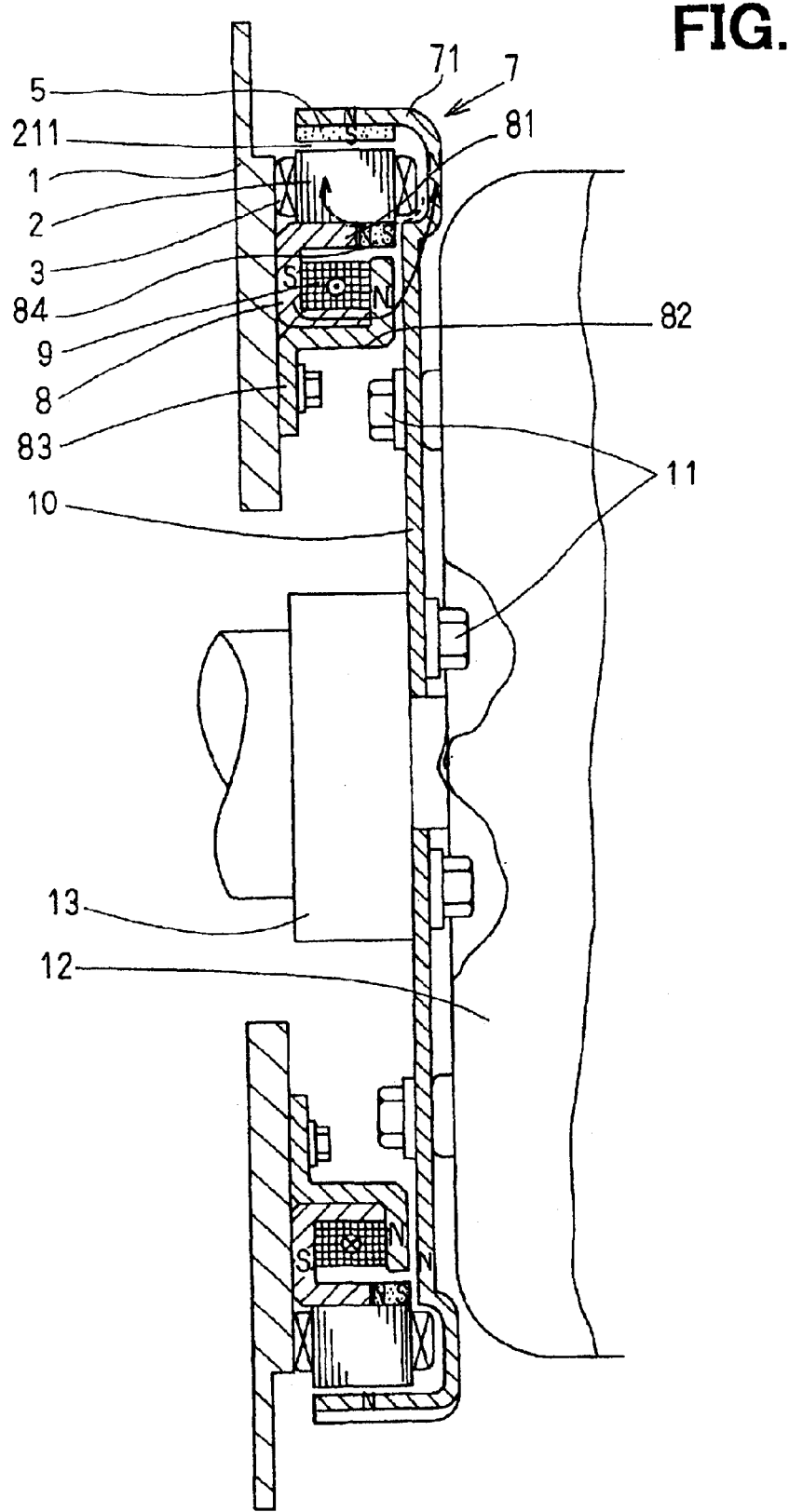
FIG. 8 is a schematic cross-sectional side view of a rotary electric machine according to the fifth embodiment of the invention.

A flat generator to be directly connected to a vehicle engine according to the fifth embodiment of the invention is described with reference to FIGS. 8, 9 and 10.

The flat generator according to the fifth embodiment is comprised of a housing 1, a stator including an annular armature core 2, an armature winding 3 wound around the armature core 2, a field core member 8 and a field coil 9 and a rotor including a plurality of permanent magnets 5 and a cup-shaped rotor core 7 that is made from an iron plate to support the permanent magnets 5. The stator is fixed to the housing 1.

The cup-shaped rotor core 7 has a cylindrical core member 71 and a hub member that functions as a yoke. The cylindrical core member 71 has a plurality of permanent magnets 4 circumferentially disposed at 360 degree in electric angle and magnet-conductive salient magnetic poles 74 disposed between the permanent magnets 4 to face the armature core 2 through an air gap 211. All the permanent magnets 5 are magnetized in the same radial direction so that all the salient magnetic poles are polarized to be the same magnetic polality.

The field core member 8 has a cylindrical yoke member 81 that supports the armature core 2 on the radially outside surface thereof and a permanent magnet 84 on the axial end thereof and a gutter-like member 82 that supports the field coil 9 therein. The permanent magnet 84 is magnetized to reduce remnant magnetic flux of the field core member 8.

The armature core 2 has six teeth in a 180-degree electric angle that corresponds to an angle between one of the permanent magnets 4 and the neighboring salient magnetic pole 74. The armature winding 3 is comprised of a pair of three-phase windings that generates ac power at 30 degrees in electric angle different from each other, as shown in FIG. 10. Each phase winding is comprised of a plurality of flat conductor segments. The coil ends of the windings are about 8 mm high, which is about one third of a Lundell type ac generator that has approximately the same volume.

Figure 9:
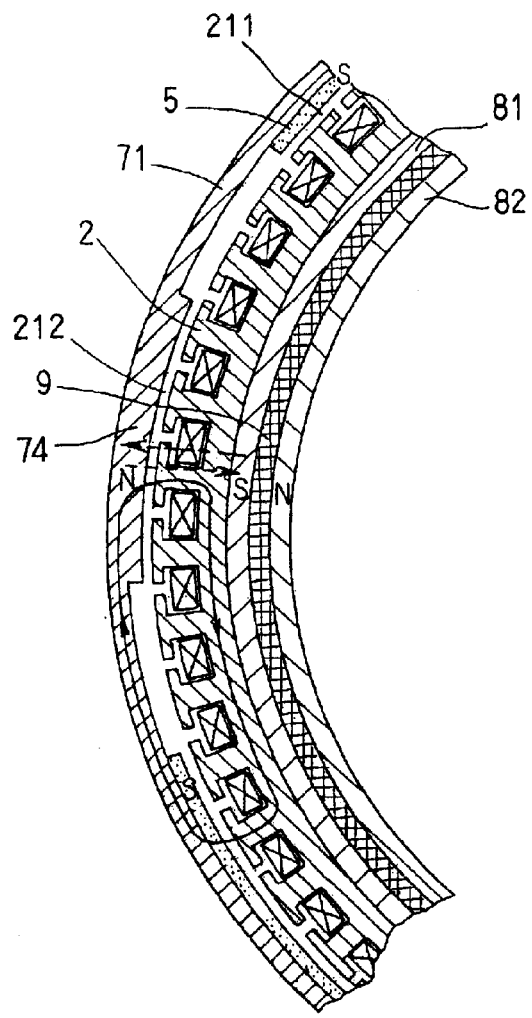
FIG. 9 is a partially cross-sectional enlarged plan view of a main portion of the rotary electric machine shown in FIG. 8.
Figure 10:
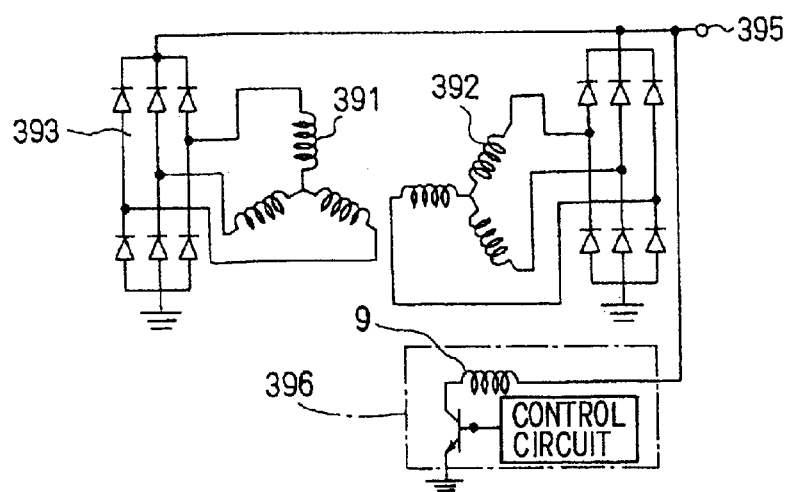
FIG. 10 is a circuit diagram of the rotary electric machine according to the fifth embodiment.

When the generator is rotated by an engine, the armature winding 2 generates ac power as the magnetic flux supplied by the permanent magnets 4 crosses the armature winding 2, as indicated by a solid line in FIG. 9. Subsequently, field current is supplied to the field coil 9 to increase the magnetic flux, the armature winding increases its output ac power.

The flat generator generates ac power at the pair of three-phase windings 391, 392. The ac power is converted into dc power by a pair of rectifier unit 392, 393. The output voltage of the dc power is controlled by a control circuit 396 that control current supplied to the field coil 9.

Figure 11:
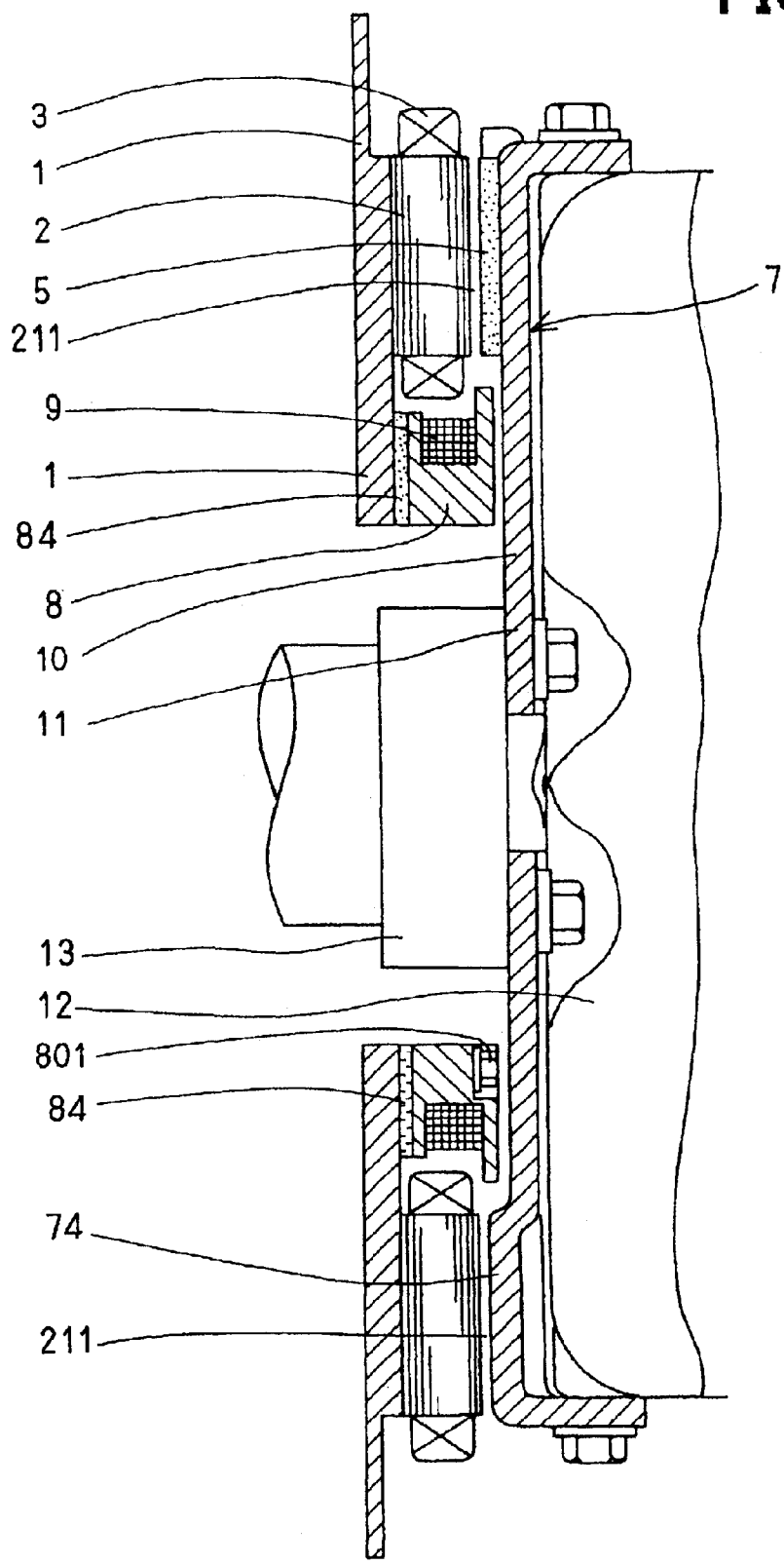
FIG. 11 is a schematic cross-sectional side view of a rotary electric machine according to the sixth embodiment of the invention.
Figure 12:
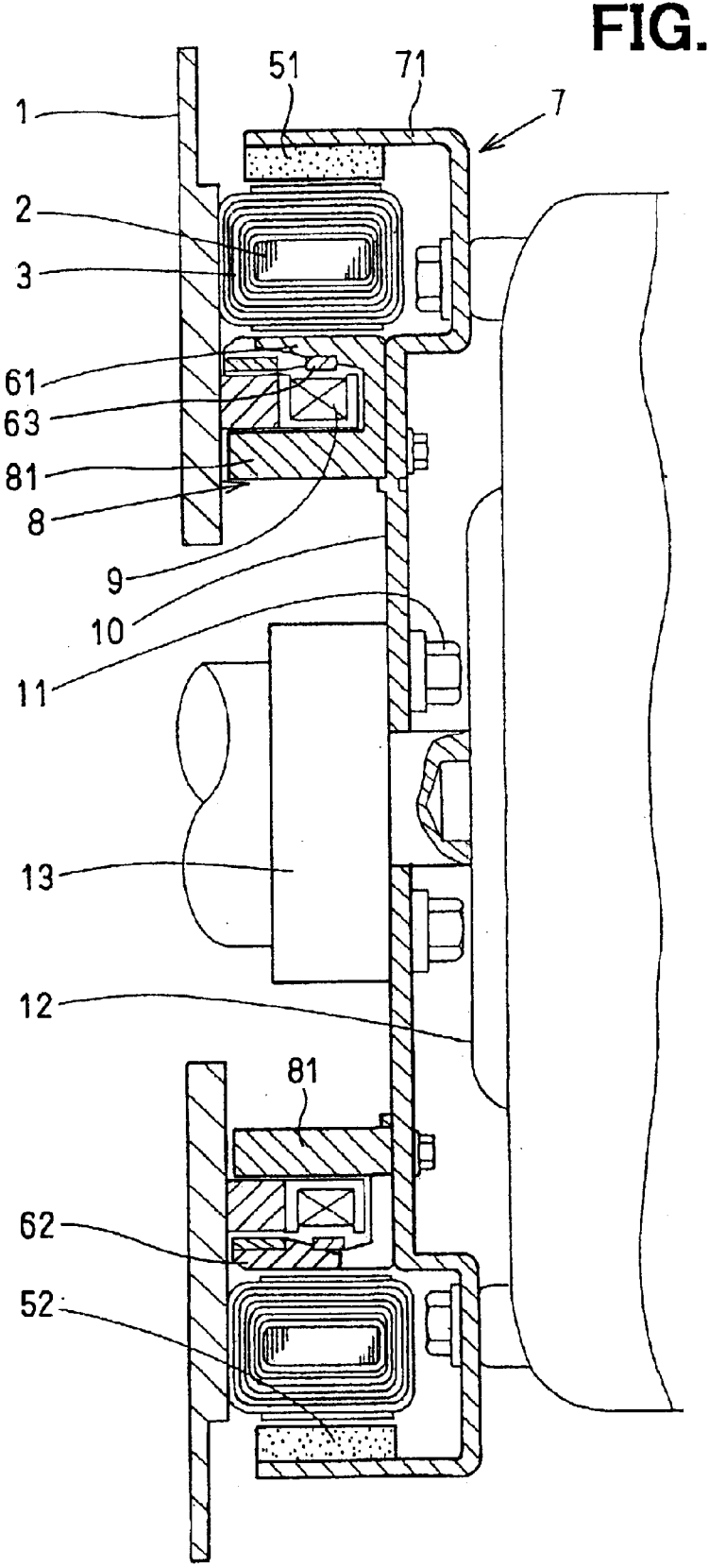
FIG. 12 is a schematic cross-sectional side view of a rotary electric machine according to the seventh embodiment of the invention.

A flat generator to be directly connected to a vehicle engine according to the sixth embodiment of the invention is described with reference to FIG. 11.

The flat generator according to the sixth embodiment is comprised of a housing 1 made of an iron plate, a stator including an annular armature core 2, an armature winding 3 wound around the armature core 2, a field core member 8 and a field coil 9 and a rotor including a plurality of permanent magnets 5 and a disk-like rotor core 7 that is made from an iron plate to support the permanent magnets 5. The stator is fixed to the housing 1, which functions as a yoke.

The disk-like rotor core 7 has a hub member 11 that functions as a yoke. The disk-like core member 7 has a plurality of permanent magnets 4 circumferentially disposed at 360 degree in electric angle and magnet-conductive salient magnetic poles 74 disposed between the permanent magnets 4 to face the armature core 2 through an air gap 211. The armature core 2 has axially extending teeth for receiving magnetic flux of the permanent magnets 5.

All the permanent magnets 5 are magnetized in the same radial direction so that all the salient magnetic poles are polarized to be N or S.

The field core member 8 has a gutter-like shape that supports the field coil 9 therein. A permanent magnet 84 is fixed to a portion between the housing 1 and the field core member 8 by fastening bolts 801. The permanent magnet 84 is magnetized to reduce remnant magnetic flux of the field core member 8.

The flat generator according to the sixth embodiment provides a larger sectional area of the air gaps than the flat generator according to the fifth embodiment, which increases effective magnetic flux.

Figure 13:
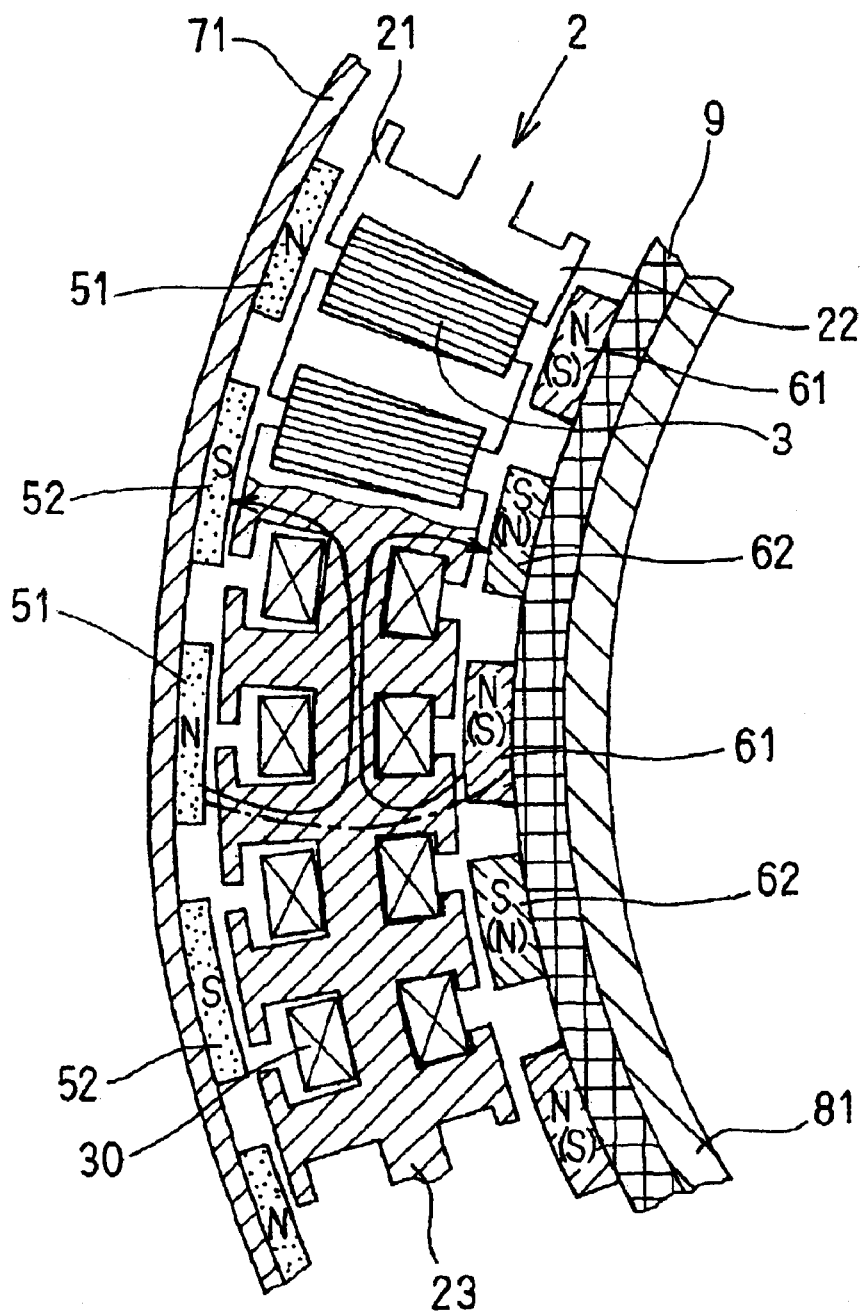
FIG. 13 is a partially cross-sectional enlarged plan view of a main portion of the rotary electric machine shown in FIG. 12.

A flat generator directly connected to a vehicle engine according to the seventh embodiment is described with reference to FIG. 13.

The flat generator according to the seventh embodiment is comprised of a housing 1, a stator including an annular armature core 2, an armature winding 3 wound around the armature core 2 and an annular field coil 9 fixed to the housing 1 and a rotor including a plurality of permanent magnets 51 (polarized to N) and 52 (polarized to S), a generally cup-shaped rotor core 7 that is made from an iron plate to support the permanent magnets 5.

The armature core 2 is formed from a plurality of laminated iron sheets and has outer radial teeth 21 extending outwardly, inner radial teeth 22 extending inwardly and arc-shaped yoke portion 23 circumferentially extending in the middle of the teeth 21, 22. Three teeth 21, 22 are disposed in each two-pole pitch so that a $2\pi/3$ short-pitch winding can be provided in this embodiment. The armature winding 3 is comprised of a plurality of toroidal coils 30 connected to form a three-phase winding. The armature core 2 and the armature winding 3 are provided in substantially the same manner as the first embodiment, which is described above.

The rotor core 7 has an outer cylindrical core member 71. The core member 71 has a plurality of N-poled permanent magnets 51 and S-poled permanent magnets, which are alternately disposed at equal intervals in the circumferential direction of the core member 71 to face the teeth 21 of the armature core 2.

The field core member 8 is a so-called induction type rotor, which has a center core 81 around which the annular field coil 9 is disposed at a suitable air gap. The claw-shaped magnetic poles 61, 62 alternately extend from opposite axial ends of the center core 81 to interleave with each other in the axial direction. The claw-shaped magnetic poles 61 are integrally connected to the center core 81, and the claw-shaped magnetic poles 62 are fixed to the claw-shaped magnetic poles 61 by a non-magnetic metal ring 63, so that the both magnetic poles 61 and 62 can rotate relative to the annular field coil 9. The claw-shaped magnetic poles 61, 62 are respectively disposed at circumferential positions opposite the permanent magnets 51, 52 and polarized by the field coil 9 to have a polarity that is the same as or different from the opponent permanent magnets 51, 52, as shown in FIG. 13 to generate suitable power according to prescribed conditions.

When the rotor core 7 is rotated by the crankshaft 13 of an engine, The permanent magnets 51, 52 and the magnetic poles 61, 62 supply a rotating magnetic field to the armature winding 3. When the field coil 9 polarizes the magnetic poles 61 to N-pole and magnetic poles 62 to S-pole, the magnetic flux flows as indicated by solid lines. On the other hand, the magnetic flux flows as indicated by a one-dot chain line when the field coil 9 polarizes the magnetic poles 61 to S-pole and magnetic poles 62 to N-pole.

Figure 14:
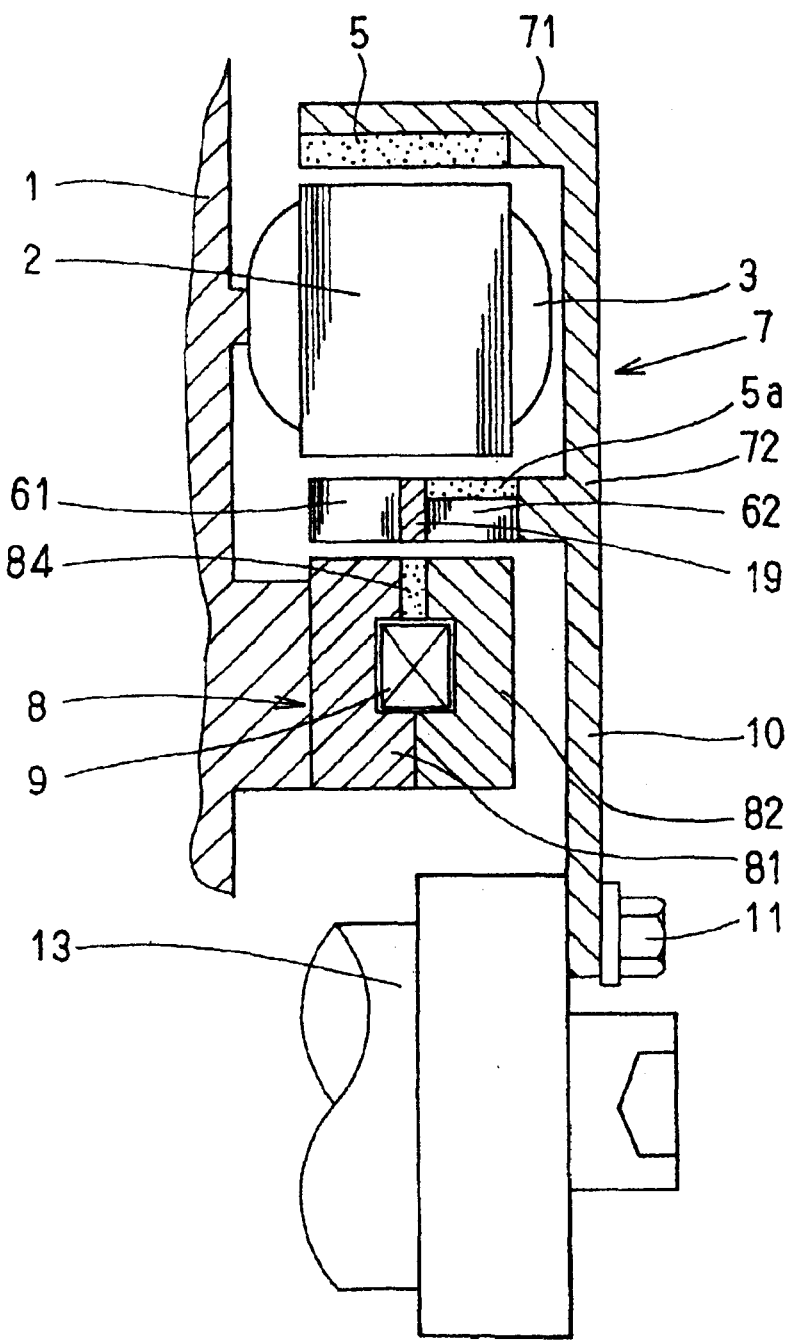
FIG. 14 is a schematic cross-sectional side view of a main portion of a rotary electric machine according to the eighth embodiment of the invention.

A flat generator to be directly connected to a vehicle engine according to the eighth embodiment of the invention is described with reference to FIG. 14.

The flat generator according to the eighth embodiment is comprised of a housing 1 made of an iron plate, a stator including an annular armature core 2, an armature winding 3 wound around the armature core 2, a field core member 8 and a field coil 9 and a rotor including a gutter-like rotor core 7 that is made from an iron plate. The gutter-like core member has a pair of coaxially disposed cylindrical core members 71, 72. A plurality of permanent magnets 5 is disposed on the outer cylindrical member 71, and a plurality of permanent magnets 5a is disposed on the inner cylindrical core member 71. A plurality of magnet conductive pole members 61, 62 is disposed between the permanent magnets 5 and 5a.

All the permanent magnets 5, 5a are magnetized in the same radial direction so that all the salient magnetic poles are polarized to be N or S.

The field core member 8 has a gutter-like shape that supports the field coil 9 therein. A permanent magnet 84 is disposed between the housing 1 and the field core member. The permanent magnet 84 is magnetized to reduce remnant magnetic flux of the field core member 8.

Because the permanent magnets 5, 5a are disposed on both cylindrical core members 71 and 72, a compact generator can be provided.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A flat rotary electric machine comprising:
   a stator having an annular stator core with an annular yoke and a plurality of teeth projecting from said yoke in opposite directions and an armature winding wound around said stator core; and
   a field unit including a gutter-like field core having a pair of coaxial cylindrical core members respectively disposed to face said teeth and a ring-shaped yoke member connecting said cylindrical core members, a plurality of permanent magnets respectively disposed on said cylindrical core members to face said teeth through a first air gap so that one of said permanent magnets on one of said cylindrical core members is disposed between adjacent two of said permanent magnets on the other cylindrical core member and an annular field coil disposed near said ring-shaped yoke member between said cylindrical core members;
   wherein:
      each of said cylindrical core member has a plurality of magnet-conductive salient magnetic poles disposed between said permanent magnets to face said stator through a second air gap, and
      said permanent magnets are magnetized so that all the magnetic flux thereof can cross said stator through said teeth in the same direction.

2. The flat rotary electric machine as claimed in claim 1, wherein sectional area of said first air gap is larger than sectional area of said second air gap.

3. The flat rotary electric machine as claimed in claim 1, wherein said teeth respectively extending in radial directions from said yoke and a plurality of toroidal coils respectively disposed between said teeth.

4. The flat rotary electric machine as claimed in claim 3, wherein:
   said stator comprises a plurality of tooth-and yoke units having a tooth which is inserted into one of said toroidal coils and an arc-shaped teeth-and-yoke unit connected to one another by a coupling; and
   said coupling comprises a concavity disposed at one circumferential end of said teeth-and-yoke unit and a convexity disposed at the other circumferential end.

5. The flat rotary electric machine as claimed in claim 1, wherein: said magnetic poles are made of a plurality of laminated iron sheets having dovetail grooves disposed between said magnetic poles, and
   each of said permanent magnets is disposed in one of said grooves.

6. A flat rotary electric machine comprising:
   a stator having an annular stator core with an annular yoke and a plurality of teeth projecting from said yoke in opposite directions and an armature winding wound around said stator core;
   a rotary field core including an open gutter portion having a pair of cylindrical core members respectively disposed to face said teeth and a closed gutter portion having a space;
   a plurality of permanent magnets respectively disposed on said cylindrical core members to face said teeth through a first air gap so that one of said permanent magnets on one of said cylindrical core members is disposed between adjacent two of said permanent magnets on the other cylindrical core member; and
   a stationary annular field coil disposed in said space of said closed gutter portion to supply magnetic flux thereto.

7. The flat rotary electric machine as claimed in claim 6, wherein:
   said stator core has six teeth each pole pitch, and
   said armature winding comprises a plurality of toroidal coils circumferentially disposed between said teeth.

8. The flat rotary electric machine as claimed in claim 7, wherein said toroidal coils are connected to form a three-phase winding.

9. The flat rotary electric machine as claimed in claim 7, wherein said toroidal coils are connected to form a plurality of three-phase windings.

10. A flat rotary electric machine comprising:
    a magnet-conductive housing;
    an annular stator core fixed to and magnetically connected to said housing, said stator core having a plurality of teeth and an armature winding mounted in said stator core;
    a rotary field core having a plurality of magnetic poles circumferentially disposed at intervals of 360 degree in electric angle to face said teeth through a first air gap;
    a plurality of permanent magnets respectively disposed on said field core to face said teeth through a second air gap so that one of said permanent magnets is disposed between adjacent two of said magnetic poles;

an stationary field coil unit fixed and magnetically connected to said housing to be disposed between stator core and said field core, said field coil unit having an annular field coil for polarizing said magnetic poles and a yoke member facing said rotary field core through a third air gap;

wherein:
said permanent magnets are magnetized so that all the magnetic flux thereof can cross said stator through said teeth in the same direction.

11. The flat rotary electric machine as claimed in claim 10, wherein said rotary field core comprises a cylindrical member having an inside surface on which said magnetic poles and said permanent magnets are disposed.

12. The flat rotary electric machine as claimed in claim 10, further comprising a control means connected to said field coil for controlling current supplied to said field coil.

13. The flat rotary electric machine as claimed in claim 10,
wherein said magnetic poles and said teeth face to each other in the axial direction thereof.

14. A flat rotary electric machine comprising:

a stator having a laminated annular stator core with an annular yoke and a plurality of teeth projecting from said yoke in opposite directions and an armature winding wound around said stator core between said teeth; and a rotary field unit including a gutter-like field core having a pair of parallel core members respectively disposed to face said teeth and a yoke member connecting said core members, a plurality of permanent magnets circumferentially disposed on one of said core members to face said teeth through a first air gap and a plurality of magnet-conductive poles circumferentially disposed on the other of said cylindrical members thereby forming magnetic passage of magnetic flux of said permanent magnets; and a stationary annular field coil disposed between said core members so as to polarize said magnet-conductive poles;

wherein:
said field coil is energized to polarize said magnetic poles to change magnetic flux of said permanent magnets.

15. The flat rotary electric machine as claimed in claim 14,
wherein said armature winding comprises a plurality of toroidal coils connected to form a multi-phase winding.

* * * * *